United States Patent
Fang et al.

(10) Patent No.: US 12,072,244 B2
(45) Date of Patent: Aug. 27, 2024

(54) JOINT WAVELET DENOISING FOR DISTRIBUTED TEMPERATURE SENSING

(71) Applicant: NEC Laboratories America, Inc., Princeton, NJ (US)

(72) Inventors: Jian Fang, Princeton, NJ (US); Ting Wang, West Windsor, NJ (US)

(73) Assignee: NEC CORPORATION, Tokyo (JP)

( * ) Notice: Subject to any disclaimer, the term of this patent is extended or adjusted under 35 U.S.C. 154(b) by 592 days.

(21) Appl. No.: 17/321,464

(22) Filed: May 16, 2021

(65) Prior Publication Data
US 2021/0356332 A1 Nov. 18, 2021

Related U.S. Application Data

(60) Provisional application No. 63/026,218, filed on May 18, 2020.

(51) Int. Cl.
| G01K 11/32 | (2021.01) |
| G01D 5/353 | (2006.01) |
| G01K 11/322 | (2021.01) |
| G01K 11/324 | (2021.01) |

(52) U.S. Cl.
CPC ....... *G01K 11/322* (2021.01); *G01D 5/35383* (2013.01); *G01K 11/324* (2021.01)

(58) Field of Classification Search
CPC ............... G01K 11/322; G01K 11/324; G01D 5/35383
See application file for complete search history.

(56) References Cited

U.S. PATENT DOCUMENTS

| 8,152,370 B2 * | 4/2012 | Martinelli | G01K 11/32 374/161 |
| 9,322,740 B2 * | 4/2016 | Liu | G01D 5/35354 |
| 11,204,286 B2 * | 12/2021 | Li | H04B 10/502 |
| 2007/0229816 A1 * | 10/2007 | Chen | G01K 11/32 374/E11.015 |
| 2013/0156066 A1 * | 6/2013 | Kwon | G01K 11/32 374/161 |
| 2018/0080812 A1 * | 3/2018 | Wu | G01H 9/004 |

OTHER PUBLICATIONS

"Wavelet Denoising" from the MATHWORKS(R) website <www.mathworks.com> downloaded Nov. 17, 2023.*
"Wavelets and Wavelet Denoising" from "A Pragmatic Introduction to Signal Processing" by Professor Tom O'Haver, Dept. of Chemistry and Biology, University of Maryland at College Park Last updated Jan. 2022.*
"A New Wavelet Denoising Method for Selecting Decomposition Levels and Noise Thresholds" by Madhur et al. from the National Library of Medicine; published Jul. 7, 2016.*
"Basic Principles of Raman Scattering and Spectroscopy" downloaded from the Edmund Optics, Inc. website on Nov. 17, 2023.*
"The Wavelet Transform: An Introduction and example" from Towards Data Science by Shawhin Talebi on Dec. 20, 2020.*

* cited by examiner

*Primary Examiner* — Randy W Gibson
(74) *Attorney, Agent, or Firm* — Joseph Kolodka

(57) ABSTRACT

Aspects of the present disclosure describe systems, methods, and structures for distributed temperature sensing that employ joint wavelet denoising to achieve desirable signal-to-noise ratio(s) over extended sensor fiber distances.

6 Claims, 6 Drawing Sheets

JOINT WAVELET DENOISING FOR DISTRIBUTED TEMPERATURE SENSING

CROSS REFERENCE

This disclosure claims the benefit of U.S. Provisional Patent Application Ser. No. 63/026,218 filed May 18, 2020 the entire contents of which is incorporated by reference as if set forth at length herein.

TECHNICAL FIELD

This disclosure relates generally to distributed fiber optic sensing (DFOS). More particularly it pertains to DFOS/distributed temperature sensing (DTS) systems, methods, and structures employing joint wavelet denoising.

BACKGROUND

As is known, distributed fiber optic sensing/distributed temperature sensing has shown great utility when applied to any number of applications including infrastructure monitoring and oil and gas operation(s)—among others.

Raman optical fiber distributed temperature sensors (Raman DTSs) are optical OTDR systems that measure temperature(s) along an optical sensing fiber/cable through the effect of Raman scattering. A typical Raman DTS configuration and operation includes launching optical pump pulses into an optical fiber/cable, receiving both Raman Stokes (S) and anti-Stokes (AS) signals, and determining temperature values from amplitude(s) of the S and AS signals. Due to the nature of Raman scattering in optical fiber, the power of S and AS signals are usually very weak (<1 nW), which poses detection challenges. And while high-gain avalanche photodetectors have been adopted for use in Raman DTS systems to improve detection characteristics, the signal-to-noise ratio (SNR) experienced at a far-end of the sensing fiber—especially when the fiber is long—is still very low, resulting in large measurement errors which are not suitable for long-range sensing applications.

SUMMARY

The above problems are solved and an advance in the art is made according to aspects of the present disclosure directed to systems, methods, and structures for distributed temperature sensing.

In sharp contrast to the prior art, systems, methods, and structures according to aspects of the present disclosure employ joint wavelet denoising to achieve superior SNR over extended sensor fiber distances as compared to the prior art.

BRIEF DESCRIPTION OF THE DRAWING

A more complete understanding of the present disclosure may be realized by reference to the accompanying drawing in which.

Figure 1:
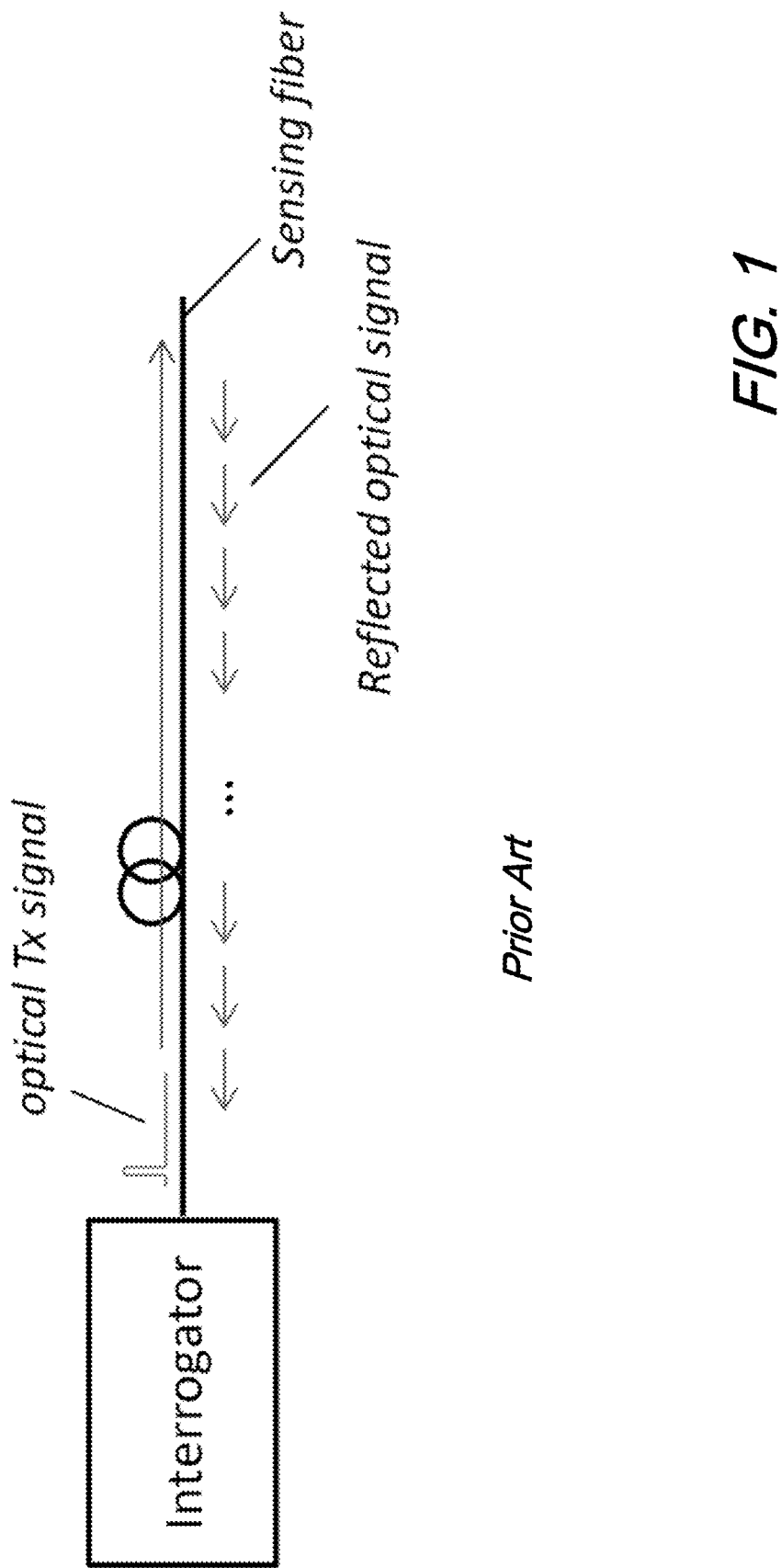
FIG. 1 shows a schematic diagram of an illustrative prior art distributed fiber optic sensing system for distributed fiber optic sensing (DFOS) as generally known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—and with reference to FIG. 1 which is a schematic diagram of an illustrative distributed fiber optic sensing system (DFOS) generally known in the art—we begin by noting that distributed fiber optic sensing (DFOS) is an important and widely used technology to detect environmental conditions such as temperature (distributed temperature sensing—DTS), vibration (distributed vibration sensing—DVS), stretch level etc. anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as Raman Stokes and anti-Stokes signals that convey—for example—a temperature from values of amplitudes of the reflected signals.

The reflected signal is converted to electrical domain and processed inside the interrogator. Based on the pulse injection time and the time signal is detected, the interrogator determines at which location along the fiber the signal is coming from, thus able to sense temperature(s) of each location along the fiber.

As we have noted previously, due to the nature of Raman scattering in optical fiber, the power of Stokes (S) and anti-Stokes (AS) signals are usually very weak (<1 nW), which poses detection challenges. And notwithstanding the widespread use of high-gain avalanche photodetectors adopted for use in Raman DTS systems to improve detection characteristics, the signal-to-noise ratio (SNR) experienced at a far-end of the sensing fiber—especially when the fiber is long—is still very low, resulting in large measurement errors which of course are not suitable for long-range sensing applications.

To reduce noise and enhance SNR, several signal denoising methods have been introduced to Raman DTS systems in the prior art. One common method averages the determined temperatures. However, the averaging time cannot indefinitely increase since the temperature status of the sensing fiber needs to be reported timely. That is to say, the temperature of the sensing fiber may change rendering the average less useful at a later time—when averaging continues. Another denoising method uses filters (either time-domain or frequency-domain) which reject some out-band noise components. However, since the Raman signals usually occupy a rather broad bandwidth, filters degrade the spatial resolution and deteriorate the sensing performance.

To reduce noise while maintaining spatial resolution, a wavelet denoising (WD) technique has been adopted in Raman DTS systems. As is known in the art, WD is a fast-processing and edge-preserving signal denoising technique which is based on a wavelet transform. Compared with the filtering technique, WD can effectively reduce the noise without sacrificing spatial resolution. The WD method attempts to denoise the S and AS signals separately with the wavelet shrinkage denoising method, as shown in FIG. 1—which shows a schematic diagram of prior art wavelet denoising for DTS.

Operationally, for each signal (S or AS), the prior art wavelet denoising process illustrated in the figure may be briefly described as follows: 1) Choose a proper base wavelet and decomposition level (L); (2) Conduct the L-level wavelet transform (could be continuous wavelet transform, CWT, or discrete wavelet transform, DWT, etc.) to decompose the input signal (could be S or AS) into L-layer wavelet coefficients; (3) Estimate the noise level and determine the noise threshold; (4) Apply a proper thresholding or shrinkage functions on the wavelet coefficients; and (5) Reconstruct the denoised signal through the inverse wavelet transform. Finally, the denoised S and AS signals are used to determine the measured temperature.

We note that this prior art approach has been described as useful in the literature. However, in real applications its performance is limited for at least several reasons.

First, the prior art WD method cannot always remove all noise components. Although a noise threshold estimation is designed statistically, with a finite length of data, the noise at certain positions along the length of sensor fiber may still remain after denoising. This will lead to unfavorable artifacts such as glitches, distortion, or Gibbs' ringing on the temperature measurement—which deteriorates any smoothness.

Second, the prior art WD method merely considers the S and AS signals as separate and applies existing WD methods on them—separately.

Figure 2:
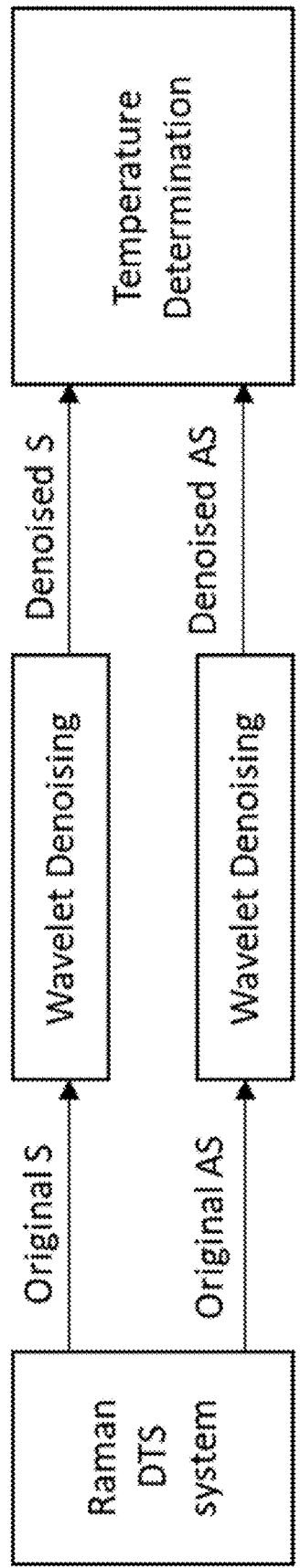
FIG. 2 shows a schematic diagram of an illustrative prior art approach to wavelet denoising for distributed temperature sensing.
Figure 3:
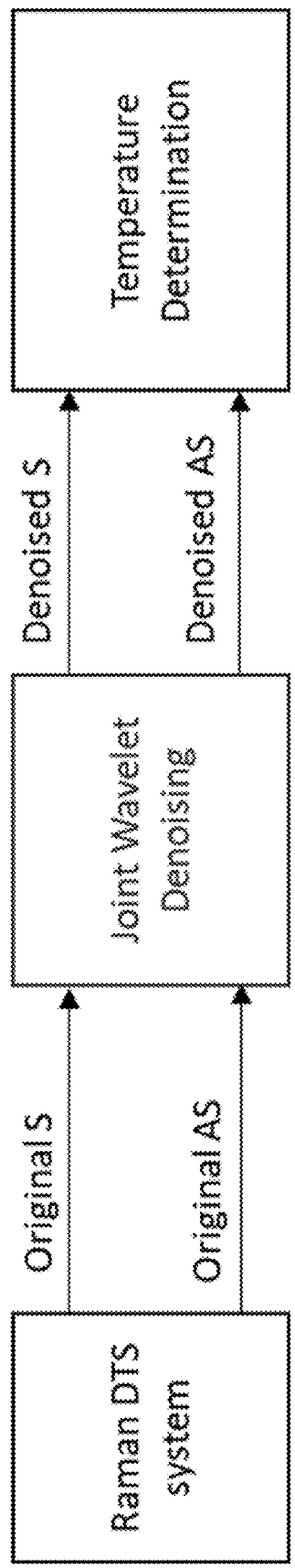
FIG. 3 shows a schematic diagram of illustrative joint wavelet denoising for distributed temperature sensing according to aspects of the present disclosure.

In sharp contrast to the prior art, systems, methods, and structures according to aspects of the present disclosure advantageously solves the problem noted above and cures the prior art infirmities by employing a new wavelet denoising technique we call joint wavelet denoising (JWD). More particularly—while the prior art technique(s) treat AS and S signals separately—systems, methods, and structures according to aspects of the present disclosure that employ JWD advantageously consider them jointly. In further contrast to the prior art, our JWD technique advantageously exploits the common temperature dependence of the AS and S signals to identify a real temperature event/measurement from noise, as illustratively shown in FIG. 2.

In JWD, the AS and S will be decomposed into multiple layers of wavelet coefficients. The noise levels and thresholds for AS and S signals will be jointly estimated by computing their correlation, and thresholding/shrinkage will be applied to both according to the joint noise estimation.

Compared with previous, prior art methods, systems, methods, and structures according to aspects of the present disclosure present at least the following advantages.

More particularly, systems methods and structures according to aspects of the present disclosure solves the SNR problem by employing a new wavelet denoising technique we call joint wavelet denoising (JWD) which advantageously overcomes the shortcomings of existing WD methods. In sharp contrast to existing, prior art methods, our JWD techniques process anti-Stokes and Stokes light signals separately, and advantageously exploits their common temperature dependence to identify a real temperature event from the noise. In JWD, the AS and S are decomposed into multiple layers of wavelet coefficients. The noise levels and thresholds for AS and S signals are be jointly estimated by computing their correlation, and thresholding/shrinkage is applied to both of them according to the joint noise estimation.

Compared with previous methods, systems, methods, and structures according to aspects of the present disclosure exhibit at least the the following advantages. First, better denoising performance—useful signals occur at a same position in both AS and S wavelet coefficients—but noises are random and uncorrelated. After our correlation operation, the useful signal(s) are enhanced and retained, while unwanted noise is suppressed and removed. Accordingly, denoising performance is much improved over the art.

Second, Better smoothness—unfavorable artifacts such as glitches that plague other, prior art WD methods are mitigated in systems, methods, and structures according to aspects of the present disclosure.

Third, better robustness—systems, methods, and structures according to aspects of the present disclosure are less sensitive to the randomness of noise, as compared with existing, prior art WD methods.

Fourth, easy deployment—systems, methods, and structures according to aspects of the present disclosure are advantageously employed with readily implementable, modified steps in the existing WD techniques.

Fifth, low cost—systems, methods, and structures according to aspects of the present disclosure do not generally require additional, specialized hardware. Accordingly, implementation is quite cost effective.

Given such considerations, those skilled in the art will readily understand and appreciate that systems, methods, and structures according to aspects of the present disclosure provide solution(s) to an important set of problems and provide great commercial value to DOFS/DTS systems and their operation.

Those skilled in the art will readily understand and appreciate that systems, methods, and structures according to aspects of the present disclosure are applicable to many commercially important applications.

Figure 4:
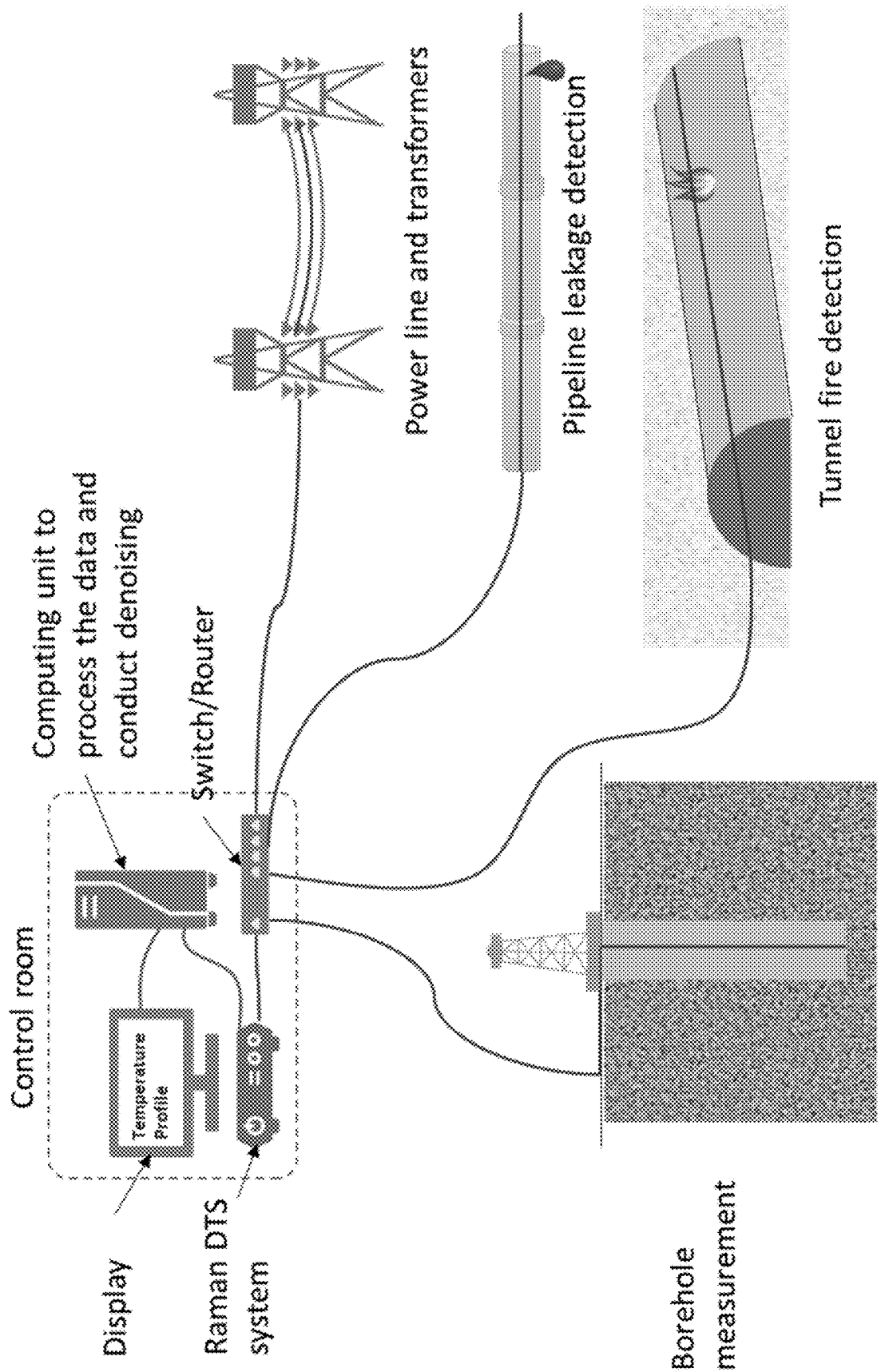
FIG. 4 shows a schematic diagram of an illustrative use case of a distributed temperature sensing arrangement according to aspects of the present disclosure.

FIG. 4 shows a schematic diagram of an illustrative use case of a distributed temperature sensing arrangement according to aspects of the present disclosure. As illustratively shown in that figure, a Raman DTS system is shown located in a central control room from which it monitors/measures temperature along optical fibers positioned along/within—for example, power lines, pipelines, tunnels, and oil and gas exploration facilities.

As we now note, particularly distinctive aspects of systems, methods, and structures according to aspects of the present disclosure include: (1) wavelet decomposition of both AS and S signals at the same time; (2) determination of correlation between the AS and S wavelet coefficients of each layer; (3) identification of any noise components by comparing the correlation with a jointly estimated noise threshold; and (4) application of proper thresholding or shrinkage functions on both the AS and S wavelet coefficients according to the joint noise identification.

We note also that with respect to the physical nature of spontaneous Raman scattering in optical fibers, AS light intensity $I_{AS}$ and S light intensity $I_S$ are both functions of temperature T which can be expressed as:

$$I_{AS}(T)=A_1 B(T)^{-1}, I_S(T)=A_2[1-B(T)]^{-1},$$

where $A_1$ and $A_2$ are temperature-independent coefficients for AS and S, respectively, and B(T) is a temperature-related function containing the desired information.

As those skilled in the art will readily understand and appreciate, this relation reveals that for a temperature-related event in a sensing fiber, both AS and S signals will have a similar response (regardless of the amplitude difference). Note that for long-range sensing distance the group velocities of AS and S light are slightly different. But after compensating this group velocity difference, the temperature-related event should occur at the identical location.

Notably, our joint wavelet denoising technique is inspired by this phenomenon that the detected AS and S signals (after group velocity compensation) are 'temperature-related' but contaminated by uncorrelated noise.

Figure 5:
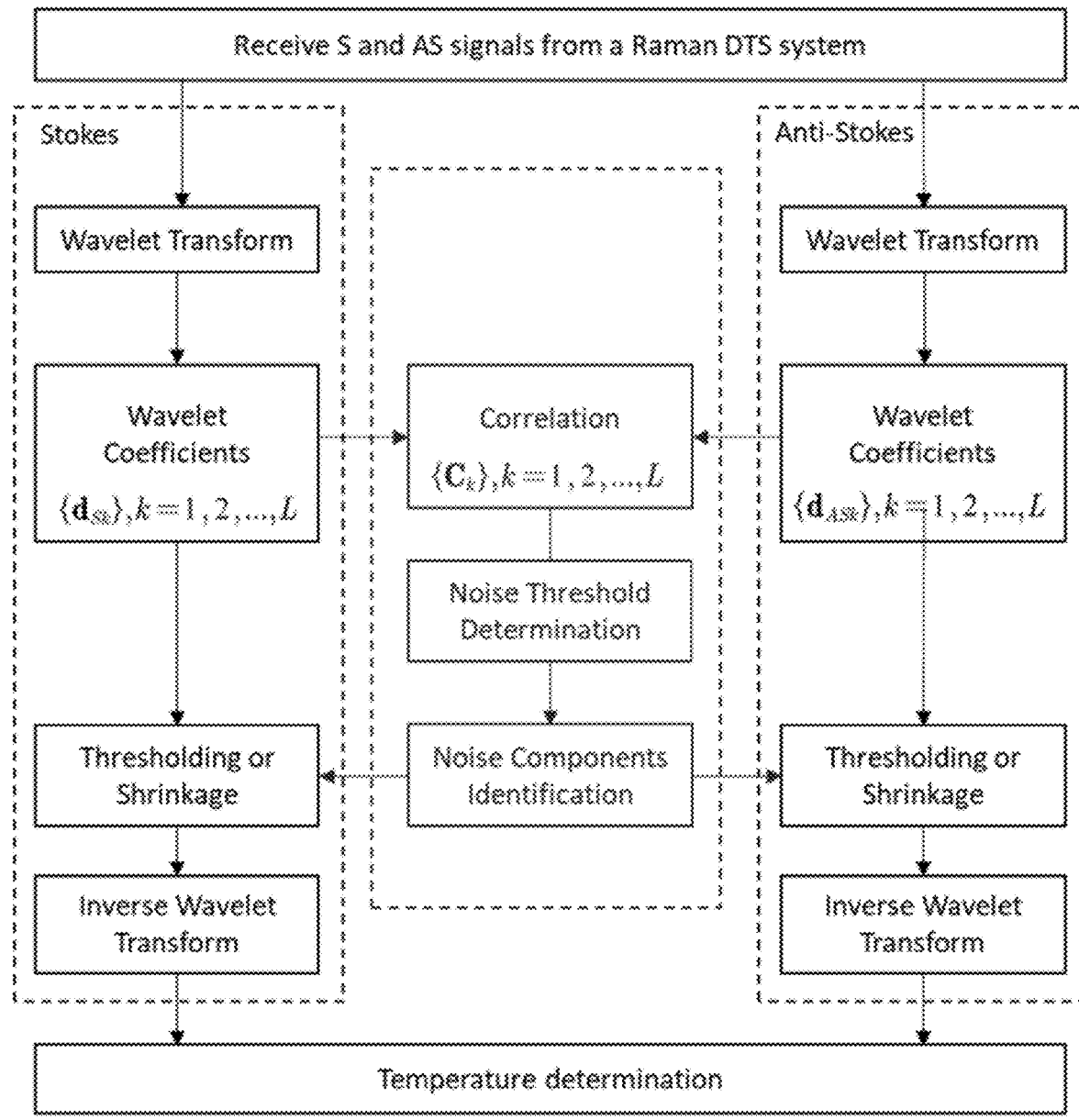
FIG. 5 shows a schematic flow diagram illustrating distributed temperature sensing with joint wavelet denoising according to aspects of the present disclosure.

FIG. 5 shows a schematic flow diagram illustrating distributed temperature sensing with joint wavelet denoising according to aspects of the present disclosure. With reference to that figure, we note that: a proper base wavelet and decomposition level (L) is chosen; an L-level wavelet transform is performed to decompose both the original AS and S signals into L-layer wavelet coefficients; correlations are determined between the AS and S wavelet coefficients of each layer; noise level(s) and noise threshold(s) from both the AS and S wavelet coefficients are jointly estimated; the noise components are identified by comparing the correlation and the jointly estimated noise threshold; a proper thresholding or shrinkage functions on both the AS and S wavelet coefficients are applied, according to the noise identification; the denoised AS and S signals are reconstructed by inverse wavelet transform; and the denoised S and AS signals are used to determine the measured temperature.

To show the effectiveness of our technique, we have conducted the Raman DTS experiment on a 20-km optical fiber. Two fiber segments (near-end and far-end) were placed in a water bath (hotspots). We compared the performance of three popular WD methods (VisuShrink, SureShrink, and MinimaxShrink).

To obtain a fair comparison, we chose the Daubechies 4 wavelet (db4) as the base wavelet for all four WD methods and fixed the decomposition level to 6. We found that that in conventional WD methods there are severe artifacts such as glitches, unremoved noise and distortion. However, with our method according to aspects of the present disclosure, glitches are mitigated, and noise is almost completely removed. Additionally, our method according to aspects of the present disclosure produces superior smoothness while maintaining sharp edges of both near-end and far-end hot-spot events. These preliminary experimental findings have verified the effectiveness and advantages of our techniques and systems, methods, and structures employing same.

Figure 6:
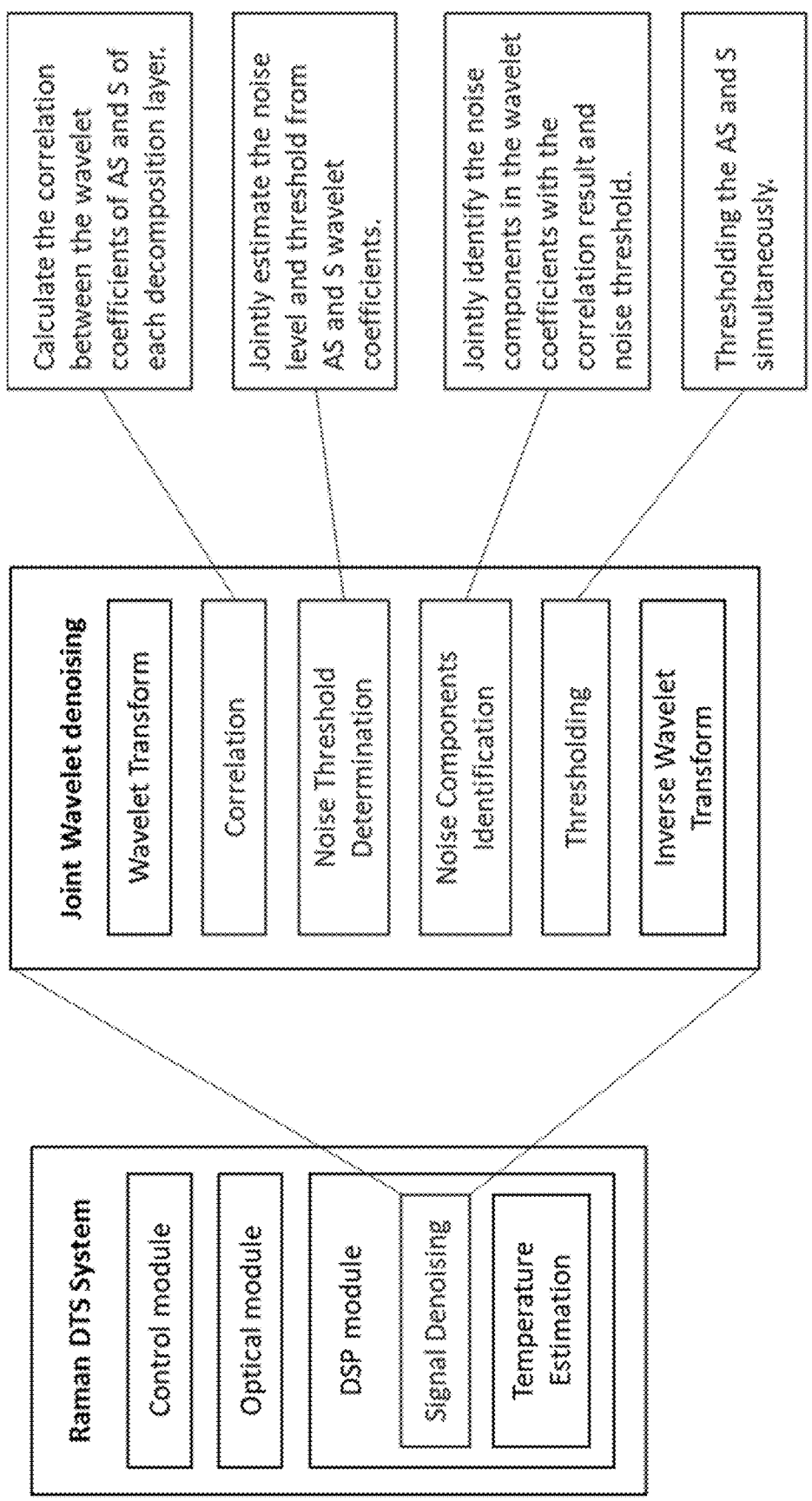
FIG. 6 shows a schematic block diagram showing numerous features of systems, methods, and structures according to aspects of the present disclosure.

FIG. 6 shows a schematic block diagram showing numerous features of systems, methods, and structures according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A distributed temperature sensing (DTS) system comprising:
   a length of optical sensing fiber;
   an optical interrogator unit that generates optical pulses, introduces them into the optical fiber, and receives backscattered Stokes (S) and anti-Stokes (AS) signals from the optical fiber; and
   a computer programmed to perform
      joint wavelet denoising (WD) of both AS and S signals at the same time; and
      determine the one or more temperatures from the denoised AS and S signals; and
      output the determined one or more temperatures;
      wherein the WD of both AS and S signals is achieved by a method selected from the group consisting of VisuShrink, SureShrink, and MinimaxShrink, the selected method having a Daubechies 4 wavelet (db4) as a base wavelet and a decomposition level of 6.

2. The system of claim 1
   wherein the AS and S signals are decomposed into multiple layers of wavelet coefficients.

3. The system of claim 2 wherein the computer is programmed to
   determine a correlation between the AS and S wavelet coefficients at each one of the multiple layers.

4. The system of claim 3 wherein the computer is programmed to
   determine a jointly estimated noise threshold and identifying noise components by comparing correlations with the jointly estimated noise threshold.

5. The system of claim 4 wherein the computer is programmed to
   apply a thresholding or shrinkage function on both the AS and S wavelet coefficients simultaneously, according to the identified noise components.

6. The system of claim 5 wherein the computer is programmed to
   reconstruct denoised S and AS signals by inverse wavelet transform.

* * * * *